US011382127B2

(12) United States Patent
Khoshnevisan et al.

(10) Patent No.: US 11,382,127 B2
(45) Date of Patent: Jul. 5, 2022

(54) TIME DOMAIN RESOURCE ALLOCATION (TDRA) FOR MULTI-TRANSMISSION TIME INTERVAL (TTI) GRANTS

(71) Applicant: QUALCOMM Incorporated, San Diego, CA (US)

(72) Inventors: Mostafa Khoshnevisan, San Diego, CA (US); Jing Sun, San Diego, CA (US); Kapil Bhattad, Bangalore (IN); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 75 days.

(21) Appl. No.: 16/864,110

(22) Filed: Apr. 30, 2020

(65) Prior Publication Data

US 2020/0351934 A1    Nov. 5, 2020

(30) Foreign Application Priority Data

May 3, 2019 (IN) .............................. 201941017814

(51) Int. Cl.
| | |
|---|---|
| *H04W 72/14* | (2009.01) |
| *H04L 5/00* | (2006.01) |
| *H04W 76/27* | (2018.01) |
| *H04W 72/04* | (2009.01) |
| *H04W 72/12* | (2009.01) |

(52) U.S. Cl.
CPC ........... *H04W 72/14* (2013.01); *H04L 5/0082* (2013.01); *H04W 72/042* (2013.01); *H04W 72/0446* (2013.01); *H04W 72/1268* (2013.01); *H04W 76/27* (2018.02)

(58) Field of Classification Search
CPC ............... H04W 72/14; H04W 72/042; H04W 72/0446; H04W 72/1268; H04W 76/27; H04L 5/0082
USPC ......................................................... 370/329
See application file for complete search history.

(56) References Cited

U.S. PATENT DOCUMENTS

| | | | |
|---|---|---|---|
| 2017/0055240 A1* | 2/2017 | Kim ..................... | H04W 72/04 |
| 2020/0351934 A1* | 11/2020 | Khoshnevisan ...... | H04W 72/14 |
| 2021/0153174 A1* | 5/2021 | Liu ....................... | H04J 3/1694 |
| 2021/0243781 A1* | 8/2021 | Lei ....................... | H04W 72/14 |
| 2021/0320760 A1* | 10/2021 | Rastegardoost ...... | H04L 1/1854 |

OTHER PUBLICATIONS

International Search Report and Written Opinion—PCT/US2020/031086—ISA/EPO—dated Jul. 24, 2020.
Panasonic: "On PUSCH Enhancements for NR URLLC," 3GPP Draft, 3GPP TSG RAN WG1 #96bis, R1-1904188_PANASONIC_NR_URLLC_PUSCH_ENHANCEMENTS_VFINAL, 3rd Generation Partnership Project (3GPP), Mobile Competence Centre, 650, Route Des Lucioles, F-06921, Sophia-Antipolis Cedex, France, vol. RAN WG1, No. Xi'an, China; Apr. 8-Apr. 12, 2019, Apr. 2, 2019 (Apr. 2, 2019), XP051707155, 6 pages.

(Continued)

*Primary Examiner* — Peter G Solinsky
(74) *Attorney, Agent, or Firm* — Patterson & Sheridan, LLP

(57) ABSTRACT

Certain aspects of the present disclosure provide techniques for time-domain resource allocation (TDRA) for multi-transmission time interval (TTI) grants.

28 Claims, 9 Drawing Sheets

(56) References Cited

OTHER PUBLICATIONS

ZTE: "PUSCH Enhancements for NR URLLC," 3GPP Draft, 3GPP TSG RAN WG1 #96bis, R1-1904145, PUSCH Enhancements for NR URLLC, 3RD Generation Partnership Project (3GPP), Mobile Competence Centre, 650, Route Des Lucioles, F-06921, Sophia-Antipolis Cedex, France, vol. RAN WG1, No. Xi'an, China; Apr. 8-12, 2019, Apr. 3, 2019 (Apr. 3, 2019), XP051707145, 7 pages, Retrieved from the Internet: URL: http://www.3gpp.org/ftp/tsg%5Fran/WG1%5FRL1/TSGR1%5F96b/Docs/R1%2D1904145%2Ezip [retrieved on Apr. 3, 2019] the whole document.

* cited by examiner

400A

| Row Index | PUSCH mapping type | $K_2$ | S | L |
|---|---|---|---|---|
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | j | 4 | 10 |
| 6 | Type B | j | 4 | 8 |
| 7 | Type B | j | 4 | 6 |
| 8 | Type A | j+1 | 0 | 14 |
| 9 | Type A | j+1 | 0 | 12 |
| 10 | Type A | j+1 | 0 | 10 |
| 11 | Type A | j+2 | 0 | 14 |
| 12 | Type A | j+2 | 0 | 12 |
| 13 | Type A | j+2 | 0 | 10 |
| 14 | Type B | j | 8 | 6 |
| 15 | Type A | j+3 | 0 | 14 |
| 16 | Type A | j+3 | 0 | 10 |

| $\mu_{PUSCH}$ | j |
|---|---|
| 0 | 1 |
| 1 | 1 |
| 2 | 2 |
| 3 | 3 |

| PUSCH mapping type | Normal cyclic prefix | | |
|---|---|---|---|
| | S | L | S+L |
| Type A | 0 | {4,...,14} | {4,...,14} |
| Type B | {0,...,13} | {1,...,14} | {1,...,14} |

FIG. 4C

TIME DOMAIN RESOURCE ALLOCATION (TDRA) FOR MULTI-TRANSMISSION TIME INTERVAL (TTI) GRANTS

PRIORITY CLAIM(S)

This application claims priority to and the benefit of Indian Provisional Application No. 2019/41017814, filed on May 3, 2019, which is expressly incorporated by reference in its entirety as if fully set forth below and for all applicable purposes.

BACKGROUND

Field of the Disclosure

Aspects of the present disclosure relate to wireless communications, and more particularly, to techniques time-domain resource allocation (TDRA) for multi-transmission time interval (TTI) grants.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink channels (e.g., for transmissions from a BS or DU to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a Base Station (BS). The method generally includes allocating time domain resources for a plurality of physical uplink shared channel (PUSCH) transmissions, according to a Time Domain Resource Allocation (TDRA) pattern selected from a TDRA table designed for multi-PUSCH grants and transmitting downlink control information (DCI) scheduling the plurality of PUSCH transmissions, wherein the DCI comprises an indication of the TDRA pattern selected from the TDRA table.

Certain aspects provide a method for wireless communication by a User Equipment (UE). The method generally includes receiving downlink control information (DCI) scheduling a plurality of physical uplink shared channel (PUSCH) transmissions, wherein time domain resources are allocated for the plurality of PUSCH transmissions according to a Time Domain Resource Allocation (TDRA) pattern selected from a TDRA table designed for multi-PUSCH grants and the DCI comprises an indication of the TDRA pattern, determining, based on the indication, the TDRA pattern from the TDRA table, and determining, based on the determined TDRA pattern, the allocation of the time domain resources for the plurality of PUSCH transmissions.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 4A illustrates an example default TDRA table 400A as defined by NR (e.g., NR Release 15).

FIG. 4B illustrates an example table 400B specifying values of j for use in determining starting symbol S as defined by NR (e.g., NR Release 15).

FIG. 4C illustrates an example table 400C specifying valid combinations of starting symbol S and allocation length L as defined by NR (e.g., NR Release 15).

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
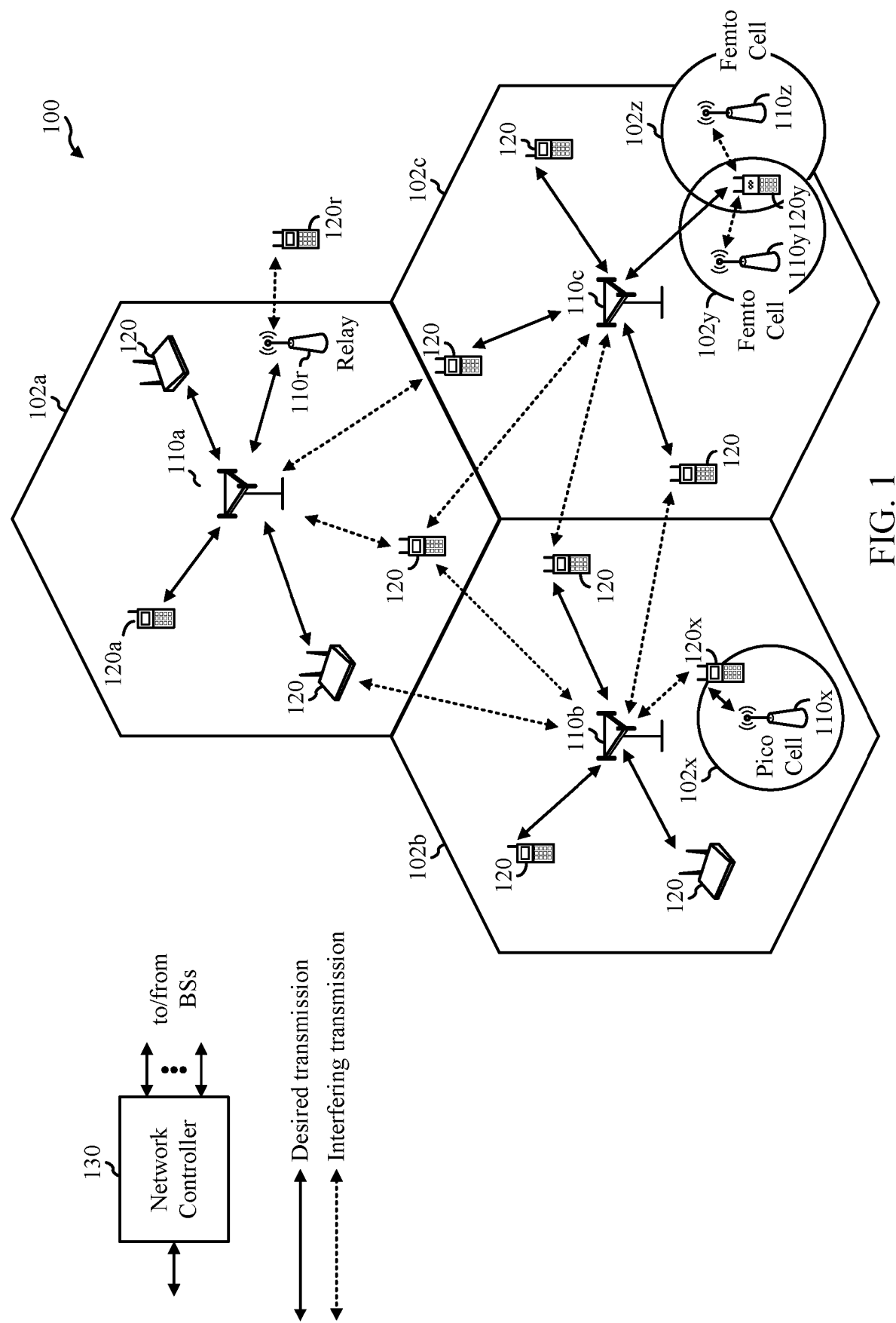
FIG. 1 is a block diagram conceptually illustrating an example telecommunications system, in accordance with certain aspects of the present disclosure.

Aspects of the present disclosure discuss TDRA design for scheduling multiple consecutive transmissions (e.g. PUSCH transmissions) in a multi-TTI DCI while allowing for mini-slot allocation in the beginning, in the middle, and/or at the end of the multi-TTI allocation.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably.

A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

New Radio (NR) is an emerging wireless communications technology under development in conjunction with the 5G Technology Forum (5GTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The techniques described herein may be used for the wireless networks and radio technologies mentioned above as well as other wireless networks and radio technologies.

For clarity, while aspects may be described herein using terminology commonly associated with 3G and/or 4G wireless technologies, aspects of the present disclosure can be applied in other generation-based communication systems, such as 5G and later, including NR technologies.

FIG. 1 illustrates an example wireless communication network 100 in which aspects of the present disclosure may be performed. For example, the wireless communication network 100 may be an NR system (e.g., a 5G NR network). In an aspect, as shown in FIG. 1, each of the User Equipments (UEs) 120 may be configured to perform operations relating to time-domain resource allocation (TDRA) for multi-transmission time interval (TTI) grants, according to aspects described herein. In an aspect, as shown in FIG. 1 each of the BSs 110 may be configured to perform operations related to time-domain resource allocation (TDRA) for multi-transmission time interval (TTI) grants, according to aspects described herein.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. In some examples, a cell may not necessarily be stationary, and the geographic area of the cell may move according to the location of a mobile BS. In some examples, the BSs may be interconnected to one another and/or to one or more other BSs or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

NR may utilize OFDM with a CP on the uplink and downlink and include support for half-duplex operation using TDD. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In FIG. 1, a solid line with double arrows indicates desired transmissions between a UE and a serving BS, which is a BS designated to serve the UE on the downlink and/or uplink. A finely dashed line with double arrows indicates potentially interfering transmissions between a UE and a BS.

Figure 2:
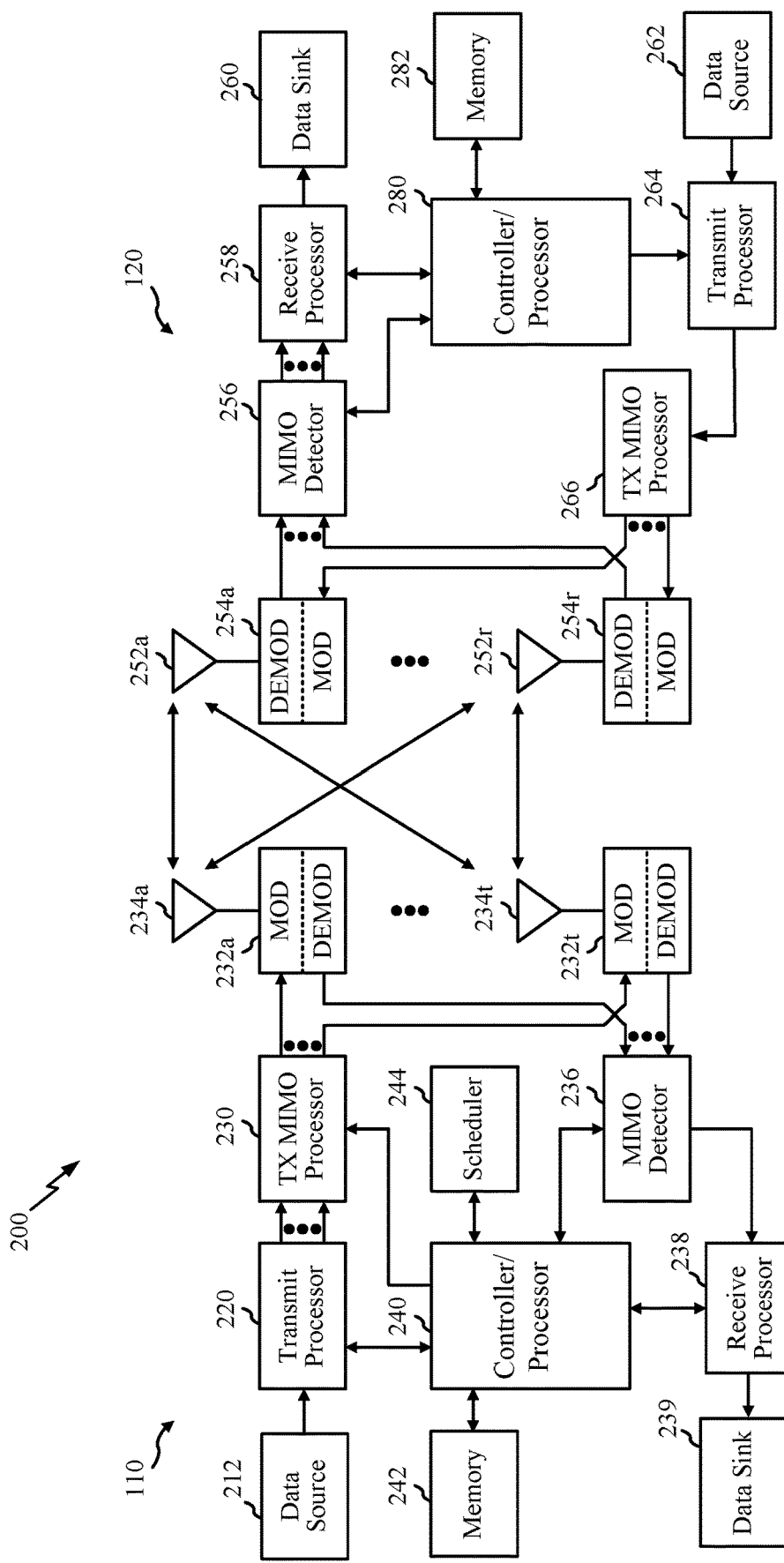
FIG. 2 is a block diagram illustrating an example architecture of a distributed radio access network (RAN), in accordance with certain aspects of the present disclosure.

FIG. 2 illustrates example components of BS 110 and UE 120 (e.g., in the wireless communication network 100 of FIG. 1), which may be used to implement aspects of the present disclosure. For example, antennas 252, processors 266, 258, 264, and/or controller/processor 280 of the UE 120 and/or antennas 234, processors 220, 230, 238, and/or controller/processor 240 of the BS 110 may be used to perform the various techniques and methods described herein. In an aspect, as shown in FIG. 2, the controller/processor 240 of the BS 110 may be configured for time-domain resource allocation (TDRA) for multi-transmission time interval (TTI) grants, according to aspects described herein. In an aspect, as shown in FIG. 2, the controller/processor 280 of the UE 120 may be configured for time-domain resource allocation (TDRA) for multi-transmission time interval (TTI) grants, according to aspects described herein.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the base station 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the BS 110 and the UE 120, respectively. The controller/processor 240 and/or other processors and modules at the BS 110 may perform or direct the execution of processes for the techniques described herein. The memories 242 and 282 may store data and program codes for BS 110 and UE 120, respectively. A scheduler 244 may schedule UEs for data transmission on the downlink and/or uplink.

Figure 3:
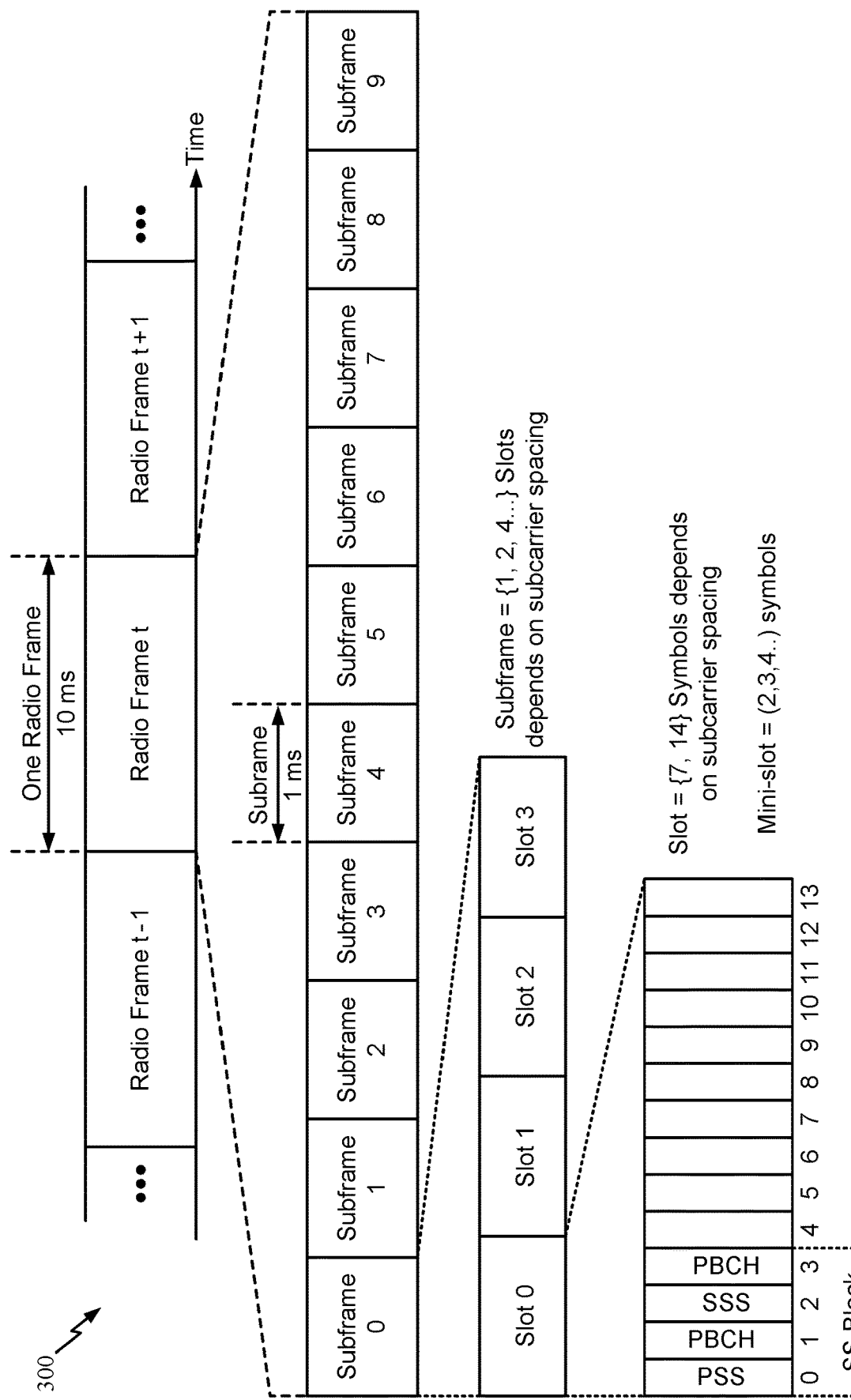
FIG. 3 illustrates an example of a frame format for a telecommunication system, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

Example Time Domain Resource Allocation (TDRA) for Multi-TTI Grants

Different systems utilize various options for Time-Domain Resource Allocation (TDRA) for transmissions (e.g., PUSCH/PDSCH transmissions) in a slot of an NR subframe.

For example, for UL grant (e.g., DCI formats 0_0 and 0_1) in NR (e.g., NR Release-15), TDRA is indicated as part of DCI. NR defines a number of options for allocating time domain resources for a transmission in a TDRA table, where each entry/row of the TDRA table defines a different allocation of time domain resources. A TDRA field in the DCI scheduling a transmission indicates one of the entries/rows from the TDRA table. A receiving UE decodes the DCI, identifies the indication in TDRA field and uses the resource allocation from the corresponding TDRA table entry for the scheduled transmission. In an aspect, the TDRA table may be a default table known to the network and the UE, or may be a configurable table that is configured via RRC signaling.

FIG. 4A illustrates an example default TDRA table 400A as defined by NR (e.g., NR Release 15).

As shown in FIG. 4A, default TDRA table 400A defines sixteen different time domain resource allocations for scheduling PUSCH transmissions, where each row of the table 400A defines a different resource allocation. For each TDRA option (e.g., each row) the columns of the table 400A include various parameters defining the details of the resource allocation. As shown in FIG. 4A, for each TDRA option (e.g., each row), the table 400A defines a Row index, a mapping type, a slot offset ($K_2$), a starting symbol (S) and an allocation length L. The mapping type may be either mapping type A or B for the scheduled PUSCH transmission. The slot offset $K_2$ provides an offset relative to the slot in which the DCI was transmitted. For example, if n represents the slot in which the scheduling DCI was transmitted, PUSCH is transmitted in slot $n+K_2$. The starting symbol S specifies the particular symbol of a slot (e.g., symbol 0, 1, 2 . . . 14) at which the corresponding PUSCH transmission is scheduled to start. The allocation length L defines a symbol length of the PUSCH transmission from the starting symbol S. Alternatively, the starting symbol S and the allocation length L may be indicated jointly as Start and Length Indicator Value (SLIV).

FIG. 4B illustrates an example table 400B specifying values of j for use in determining starting symbol S as defined by NR (e.g., NR Release 15).

The parameter $\mu_{PUSCH}$ as shown in table 400B specifies the subcarrier spacing. For example, the value 0, 1, 2 and 3 of $\mu_{PUSCH}$ represent subcarrier spacing of 15 KHz, 30 KHz, 60 KHz and 120 KHz respectively. As shown in FIG. 4B, the value of j is a function of the subcarrier spacing.

FIG. 4C illustrates an example table 400C specifying valid combinations of starting symbol S and allocation length L as defined by NR (e.g., NR Release 15).

As shown in FIG. 4B, the values of S and L in table 400B are a function of the mapping type. In addition, the values of S and L are defined such that an allocation does not cross a slot boundary. For example, S+L−1 is at most the last symbol in an allocated slot.

In certain aspects, as the TDRA field of the DCI indicates one of the entries/rows from the TDRA table, the bit length of the TDRA field is a function of the number of rows in the TDRA table. For example, bit-width of the TDRA field is 4 bits for indicating each of the sixteen TDRA options from the default TDRA table as shown in FIG. 4A.

In an aspect, the TDRA table may be a configurable (e.g., no default). For example, NR (e.g., NR Release 15) specifies that TDRA field indicates one of the entries of the higher layer parameter pusch-TimeDomainAllocationList, if this higher layer parameter is configured. The higher layer parameter pusch-TimeDomainAllocationList is an RRC parameter defining a configurable TDRA table. If this parameter is not configured, the default TDRA table is used. In an aspect, the maximum number of TDRA options (e.g., entries) configured by the configurable TDRA table is sixteen. Thus, the bit-width of the TDRA field may be 0-4 depending on a number of entries configured in the configurable table. In an aspect, like the default table, the RRC parameter pusch-TimeDomainAllocationList specifies a mapping type, a slot offset ($K_2$), a starting symbol (S) and an allocation length L for each configured TDRA entry. Additionally, the pusch-TimeDomainAllocationList specifies a maximum number of entries configured. In an aspect, the starting symbol S and the allocation length L is indicated jointly as Start and Length Indicator Value (SLIV).

In certain aspects, NR supports Multi-Transmission Time Interval (Multi-TTI) grants. A multi-TTI grant is generally a single grant (e.g., Downlink/Uplink grant) that schedules multiple transport blocks (TBs) (e.g., PDSCH or PUSCH) on multiple TTIs. In an aspect, a TTI includes a slot or a mini-slot of an NR subframe. Multi-TTI grants are particularly useful for multi-TTI PUSCH grants in NR based access to unlicensed spectrum (NRU). For example, without multi-TTI PUSCH grants, multiple downlink portions may have to be used for transmitting multiple PUSCH grants, which would not only cause additional overhead but would also involve multiple switches between downlink and uplink. Since NRU uses Listen-Before-Talk to gain access to a medium, switches between downlink and uplink may potentially lead to loss of medium.

In certain aspects, the current agreement in 3GPP standards regarding multi-TTI PUSCH grants in NRU states that "scheduling PUSCH over multiple slots/mini-slots by single DCI supports at least multiple continuous PUSCHs with separate TBs, where each TB is mapped to at most one slot or one mini-slot". It is envisioned that a similar agreement may be reached regarding multi-TTI PDSCH grants for NRU in the future.

In certain aspects, allowing allocation for mini-slots (instead of full slots) for at least some of the PUSCH transmissions scheduled by a multi-TTI grant is beneficial and in fact needed. In an aspect, mini-slot allocation may need to be allowed at the beginning (e.g., one or more initial PUSCH transmissions) of a multi-TTI transmission (scheduled by multi-TTI grant), to enable more Listen Before Talk (LBT) opportunities for the UE in the beginning of the multi-TTI transmission. In an aspect, mini-slot allocation may need to be allowed anywhere in the middle of a multi-TTI transmission. For example, if a PUSCH transmission in the middle of the multi-TTI transmission corresponds to a retransmission and Code Block Group Transmission Information (CBGTI) field in the DCI indicates only some of the CBGs require retransmission (e.g. 1 out of 8), a smaller number of resources (e.g., only some symbols of a slot and not the entire slot) are needed for the retransmission. In an aspect, since the Frequency Domain Resource Allocation (FDRA) is likely to be the same for all PUSCHs, the TDRA may indicate a smaller number of symbols than a full slot. In an aspect, mini-slot allocation may need to be allowed at the end of a multi-TTI transmission. For example, when there is not enough data in the UE buffer that would take an entire slot for a last PUSCH transmission, the last PUSCH transmission may be allocated a subset of symbols in the slot and the transmission may end a few symbols before the slot boundary.

Aspects of the present disclosure discuss TDRA design for scheduling multiple consecutive transmissions (e.g. PUSCH transmissions) in a multi-TTI DCI while allowing for mini-slot allocation in the beginning, in the middle, and/or at the end of the multi-TTI allocation.

In an aspect, the TDRA designs discussed in aspects of the present disclosure include TDRA table designs defining a number of time domain resource allocations for a multi-TTI grant. In an aspect, the discussed TDRA tables may be used as default TDRA tables (with fixed table size) or may be configured via RRC signaling (e.g., configurable entries/rows). In an aspect, the proposed TDRA table designs provide an acceptable tradeoff between scheduling flexibility and RRC overhead/TDRA field bit-width. For example, while providing scheduling flexibility in terms of the number of TDRA allocation options (e.g., number of entries/rows of the TDRA table) is important, the bit-width of the TDRA field (determined by the number of entries/rows in the TDRA table) should not be too large to avoid increasing the DCI size by too much. Additionally, a large TDRA table size including a large number of TDRA entries/rows results in a large RRC overhead to convey the table configuration. Thus, a tradeoff is needed between the scheduling flexibility offered by the TDRA table design and the size of the TDRA table.

It may be noted that while aspects of the present disclosure discuss TDRA designs with reference to multi-TTI PUSCH grants, some of the discussed TDRA designs are applicable to multi-TTI PDSCH grants.

In certain aspects, certain concepts relating to multi-TTI grants in Licensed-Assisted Access (LAA) may be leveraged for reducing the DCI size for multi-TTI grants in NR.

Multi-TTI grant in LAA uses DCI formats 0B/4B in accordance with 3GPP LTE specifications. The LTE specifications include several definitions for multi-TTI UL grants. According to the LTE specifications, a "maxNumberOfSchedSubframes" parameter is configured via Radio Resource Control (RRC) signaling. This parameter configures a maximum number of TTIs (e.g., 2 or 4 subframes) that may be scheduled by a multi-TTI grant. DCI is used to dynamically indicate how many TTIs or subframes are actually scheduled by a particular. In an aspect, the DCI uses 1 bit or 2 bits for this dynamic indication based on the maximum number of scheduled TTIs configured via RRC signaling being 2 or 4 TTIs respectively. In an aspect, the DCI size is independent of the number of TTIs scheduled dynamically, and is only a function of the maximum number of scheduled TTIs that is semi-statically configured via RRC signaling.

In certain aspects, the TDRA designs discussed in aspects of the present disclosure follow certain assumptions. For example, similar to the LAA design, a maximum number of PUSCH transmissions (represented by parameter N) (or TTIs assuming one PUSCH transmission per TTI) that can be schedule by a single multi-TTI grant (e.g., DCI) is configured via RRC signaling. An actual number of PUSCH transmissions (represented by the parameter n) scheduled by a particular multi-TTI grant (e.g., DCI) is indicated in the DCI, where n<=N. Additionally, it is assumed that no single PUSCH transmission can cross a slot boundary, that is, the start symbol and end symbol of each PUSCH transmission is within a single slot. Another assumption is that PUSCH transmissions scheduled by a multi-TTI grant are consecutive in the time domain, with no gaps between two consecutive PUSCH transmissions when scheduled by a single multi-TTI grant.

Figure 5:
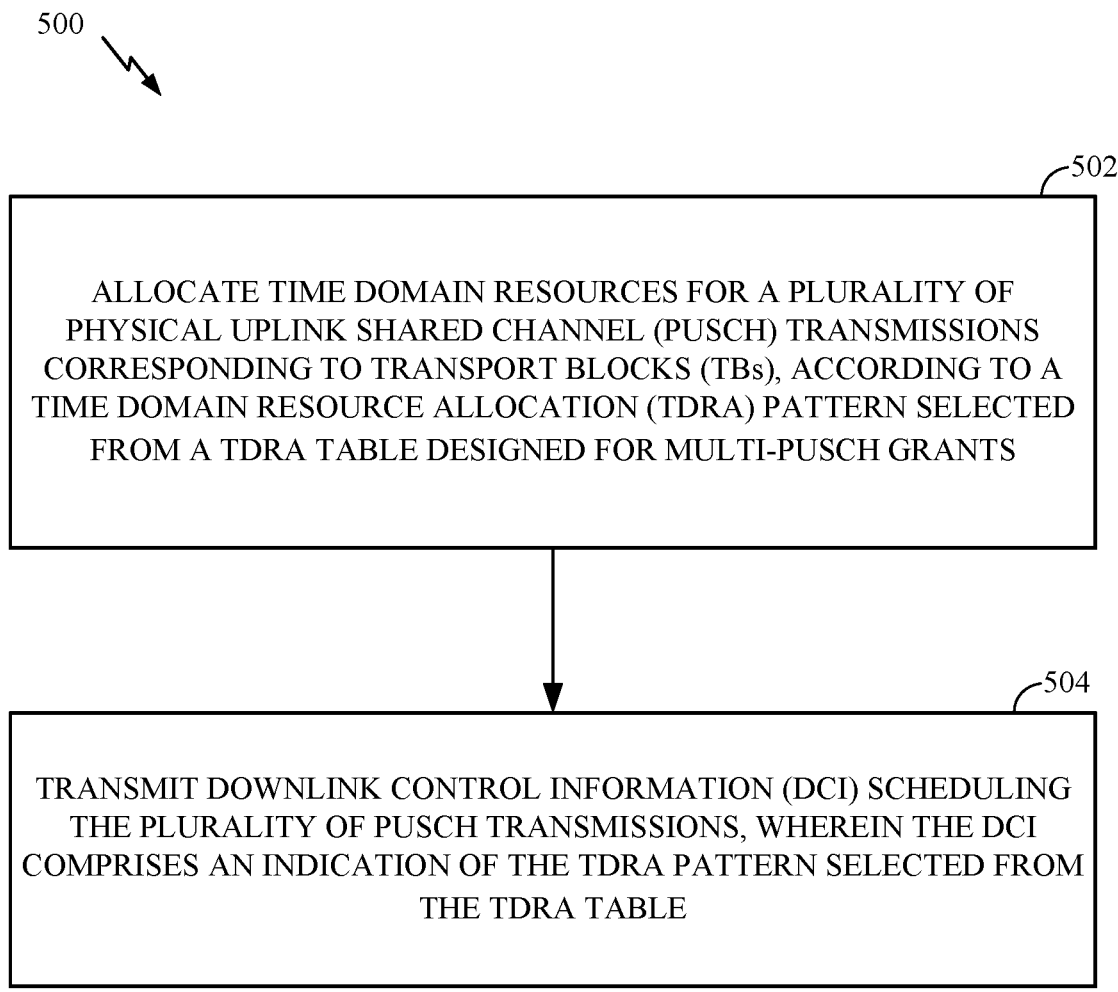
FIG. 5 illustrates example operations 500 performed by a base station (BS) for allocating time domain resource allocation for a multi-TTI grant, in accordance with aspects of the present disclosure.

FIG. 5 illustrates example operations 500 performed by a base station (BS) for allocating time domain resource allocation for a multi-TTI grant, in accordance with aspects of the present disclosure.

Operations 500 begin, at 502, by allocating time domain resources for a plurality of physical uplink shared channel (PUSCH) transmissions (e.g., corresponding to transport blocks), according to a Time Domain Resource Allocation (TDRA) pattern selected from a TDRA table designed for multi-PUSCH grants.

At 504, the BS transmits downlink control information (DCI) scheduling the plurality of PUSCH transmissions, wherein the DCI comprises an indication of the TDRA pattern selected from the TDRA table.

Figure 6:
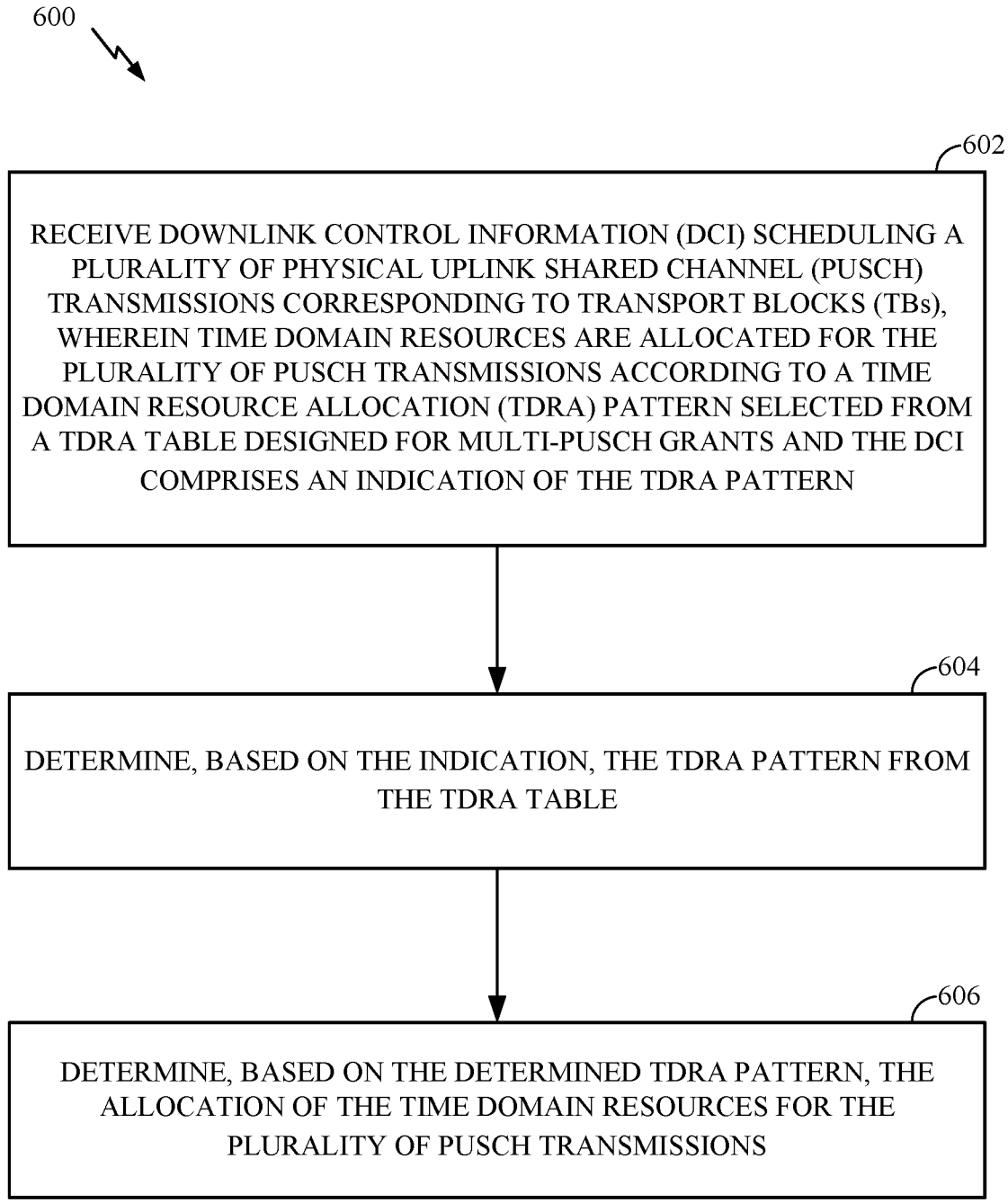
FIG. 6 illustrates example operations 600 performed by a user equipment (UE) for determining time domain resource allocation for a multi-TTI grant, in accordance with aspects of the present disclosure.

FIG. 6 illustrates example operations 600 performed by a user equipment (UE) for determining time domain resource allocation for a multi-TTI grant, in accordance with aspects of the present disclosure.

Operations 600 begin, at 602, by receiving downlink control information (DCI) scheduling a plurality of physical uplink shared channel (PUSCH) transmissions (e.g., corresponding to transport blocks), wherein time domain resources are allocated for the plurality of PUSCH transmissions according to a Time Domain Resource Allocation (TDRA) pattern selected from a TDRA table designed for multi-PUSCH grants and the DCI comprises an indication of the TDRA pattern.

At 604, the UE determines, based on the indication, the TDRA pattern from the TDRA table.

At 606, the UE determines, based on the determined TDRA pattern, the allocation of the time domain resources for the plurality of PUSCH transmissions.

In an aspect, each row of the TDRA table corresponds to a different TDRA pattern, and where each TDRA pattern is defined by allocation information in a plurality of columns of the TDRA table corresponding to the row for the TDRA pattern, where each TDRA pattern defines a different pattern for allocating time domain resources in the plurality of TTIs for the plurality of transmissions. In an aspect, the TDRA indication transmitted in the DCI indicates to a particular row/TDRA pattern form the TDRA table. In an aspect, each TTI includes a full slot or a mini-slot, wherein each TTI is assigned one transmission (PUSCH) such that different TTIs are assigned different PUSCH transmissions.

Figures 7A, 7B:
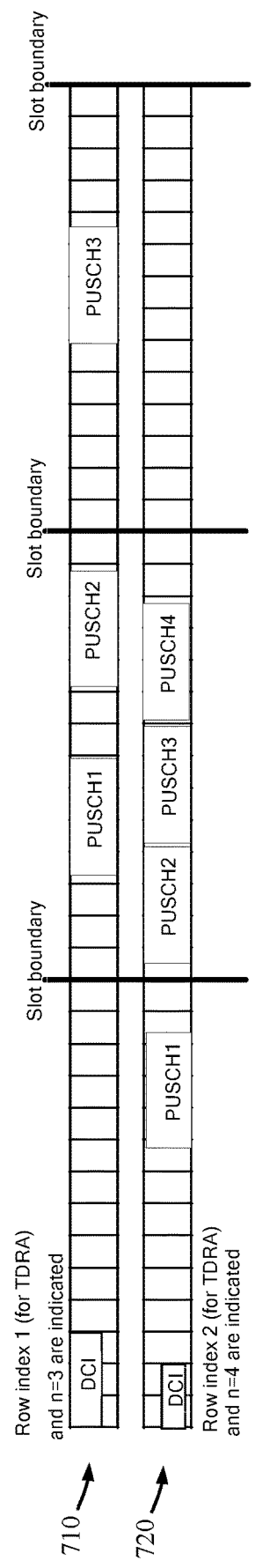
FIG. 7A illustrates an example TDRA table design 700A for multi-TTI grants (e.g., PUSCH grants), in accordance with certain aspects of the present disclosure.
FIG. 7B illustrates an example allocation 700B according to TDRA patterns defined the table 700A, in accordance with certain aspects of the present disclosure.

FIG. 7A illustrates an example TDRA table design 700A for multi-TTI grants (e.g., PUSCH grants), in accordance with certain aspects of the present disclosure.

As shown in FIG. 7A, each entry/row of the TDRA table 700A defines a different TDRA pattern for allocation of time domain resources. In some cases, each entry/row of the TDRA table 700A includes time domain resource allocations for the maximum number of PUSCH transmissions N that can be scheduled by a particular multi-TTI grant. However, as noted above, the actual number (n) of PUSCH transmissions scheduled by a particular multi-TTI grant may be less than the maximum number N (e.g., n<=N). Thus, a particular multi-TTI grant may use only 'n' number of allocations of the 'N' allocations defined in a particular TDRA pattern from the TDRA table 700A. The example TDRA table 700a is designed for N=4.

Extending a TDRA table as described herein generally allows a DCI to indicate single or multiple continuous PUSCH transmissions in any slot of the multiple scheduled slots. In some cases, the maximum number of PUSCHs that can be configured in a row of the TDRA table is 8. The actual number of scheduled PUSCHs, however, may be signaled by the number of indicated valid SLIVs in the row of the TDRA table signaled in the DCI (e.g., up to the limit of 8).

As shown in FIG. 7A, each entry/row of the TDRA table 700A is identified by a Row index that identifies a unique TDRA pattern. Each entry/row includes a slot offset (K2) and a starting symbol (S) for the first PUSCH transmission scheduled by the multi-TTI grant. Each entry/row further includes an allocation length ($L_i$) for each PUSCH i, wherein i=1–N.

Since the PUSCH allocations are assumed to be consecutive without any gap between consecutive transmissions, the start symbol for each subsequent PUSCH transmission (after the first PUSCH transmission) may be determined based on the length $L_i$ of a previous transmission. Thus, the starting symbol for a PUSCH j may be given as $S+\Sigma_{i=1}^{j-1}L_i$, where S is the starting symbol for the first PUSCH transmission. Therefore, in some cases, the starting symbol may only be provided for the first PUSCH transmission. In some cases, however (e.g., to avoid having to perform the aforementioned calculation), the starting symbol $S_j$ may be provided for each PUSCH j in addition to the allocation length $L_j$. That is, in such cases, each PUSCH j of a row is provided its own SLIV.

In some cases, each entry/row further includes a mapping type of each PUSCH i. It may be noted that, i=1, 2, . . . N, which means that the maximum number of PUSCHs (N) are considered in the table design 700A, since the actual number of PUSCH scheduled (n) is not an RRC parameter and can change dynamically. In an aspect, when the actual number of PUSCHs n<N, information from the table for i=n+1, . . . , N is not used.

FIG. 7B illustrates an example allocation 700B according to TDRA patterns defined the table 700A, in accordance with certain aspects of the present disclosure.

As shown in FIG. 7B, allocation 710 corresponds to a multi-TTI grant allocating time domain resources according to the TDRA pattern corresponding to Row index 1 from the TDRA table 700A. Similarly, allocation 720 corresponds to a multi-TTI grant allocating time domain resources according to the TDRA pattern corresponding to Row index 2 from the TDRA table 700A. As shown, each of the allocations 710 and 720 shows allocation of time domain resources over three time slots, the first slot in each case carrying the DCI scheduling the corresponding multi-TTI grant. Allocation 710 assumes the actual number of scheduled transmissions n=3 and allocation 720 assumes n=4.

As shown in allocation 710, the first PUSCH transmission (PUSCH 1) starts in slot 2, as the value of slot K2 in row index 1 is '1', which means an offset of one slot from the slot carrying the DCI grant. As shown, PUSCH 1 starts at symbol #3 as indicated by the value of starting symbol S (assuming symbol index ranges from 0-13), and is allocated 4 symbols (L1=4). Since the assumption is that all PUSCH transmissions are consecutive, PUSCH 2 starts at symbol #7 which is the consecutive symbol after the last symbol of PUSCH 1 and is allocated 7 symbols (L2=7). PUSCH 3 starts at the first symbol of slot #3 and is allocated the entire slot which is 14 symbols (L3=14). In an aspect, since n=3, allocation 710 does not use information relating to the fourth allocation (L4 and mapping for i=4) from the table 700A.

Similarly, allocation 720 allocates time domain resource in accordance with TDRA pattern defined in Row index 2. As shown, since n=4, allocation 720 uses information relating to all four allocations from the TDRA table 700A.

In an aspect, as shown in allocations 710 and 720, a PUSCH allocation cannot cross the slot boundary, meaning the start symbol and end symbol for each PUSCH j need to be in the same slot. This may be characterized by:

$$\lfloor S+\Sigma_{i=1}^{j-1} L_i/14 \rfloor = \lfloor S+(\Sigma_{i=1}^{j-1} L_i)+L_j-1/14 \rfloor \text{ for } j=1,2,\ldots,N.$$

In certain aspects, a table format of a TDRA table (e.g., TDRA table 700A) is defined by the number of columns for an entry/row in the table and the allowed values for each column. In an aspect, the table format is a function of N (max number of PUSCHs that can be scheduled by a multi-TTI grant). In an aspect, the table format determines the RRC overhead (e.g. number of bits for configuring each entry/row) when the table is configurable (i.e. not a default table).

In certain aspects, if a slot contains more than one PUSCH allocation, only the first one can be mapping type A (it can also be mapping type B), but the other PUSCHs in the slot have to be mapping type B. This may be seen from TDRA table 700A.

In certain aspects, the table size of a TDRA table (e.g., TDRA table 700A) is defined by the number of entries/rows allowed in the TDRA table. In an aspect, the table size of a TDRA table can be a function of N. This is because if a larger number of PUSCH transmissions are allowed to be scheduled by multi-TTI grant, more flexibility for TDRA is needed, which translates to more TDRA patterns or more entries/rows in the TDRA table. For example, if N=2, max 4 bits in DCI (16 entries) are allowed, if N=4, max 5 bits in DCI (32 entries) are allowed, if N=8, max 6 bits in DCI (64 entries) are allowed. In an aspect, the table size determines the DCI overhead, as the amount of bits needed to indicate an entry of the TDRA table in the TDRA field of the DCI is a function of the number of entries/rows in the TDRA table. In an aspect, the table size also determines the RRC overhead when the table is configurable.

In certain aspects, as shown in the table format of TDRA table 700A, the values of $L_i$ and mapping types are not completely independent. Hence, the information for configuring each entry of the TDRA table may be compressed.

Figures 8A, 8B, 8C:
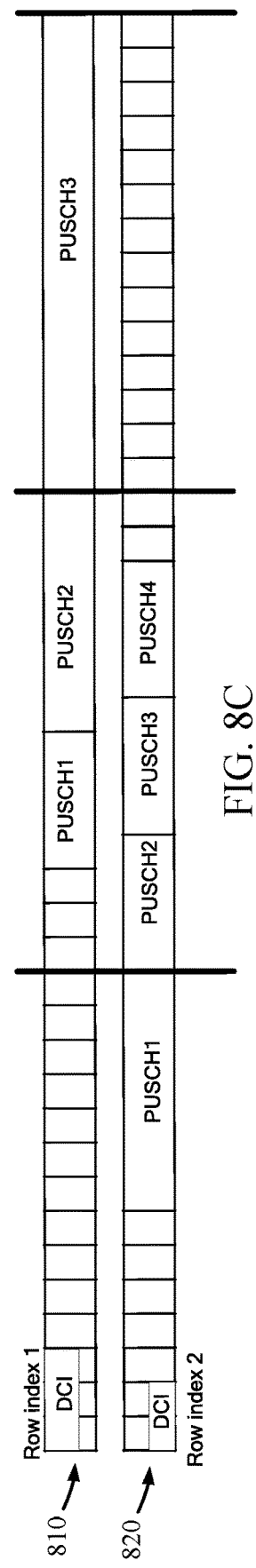
FIG. 8A illustrates an example design of a compressed TDRA table 800A for multi-TTI grants (e.g., PUSCH grants), in accordance with certain aspects of the present disclosure.
FIG. 8B illustrates an example mini-slot table 800B for defining a mini-slot structure for a given slot, in accordance with certain aspects of the present disclosure.
FIG. 8C illustrates an example allocation 800C according to TDRA patterns defined the table 800A, in accordance with certain aspects of the present disclosure.

FIG. 8A illustrates an example design of a compressed TDRA table 800A for multi-TTI grants (e.g., PUSCH grants), in accordance with certain aspects of the present disclosure.

In an aspect, each row/entry of the TDRA table 800A is identified by a unique row index and defines a different TDRA pattern for the multi-TTI grant. As shown in FIG. 8A, each row/entry includes a slot offset (K2) and starting symbol (S) for a first PUSCH transmission. Each row/entry further includes a number of scheduled slots (K) including partially allocated slots (e.g., first or last slots) and fully allocated slots (e.g., middle slots). Each row/entry further includes a member ID vector, the member ID vector including one member ID for each scheduled slot. For example, as shown in FIG. 8A, row index 1 has K=2 and the corresponding member ID vector includes two member IDs. In an aspect, each member ID of the member ID vector defines the mini-slot structure for a corresponding scheduled slot, wherein each member ID points to a unique entry/row of a mini-slot table, wherein each row of the mini-slot table defines a mini-slot structure for a given slot.

FIG. 8B illustrates an example mini-slot table 800B for defining a mini-slot structure for a given slot, in accordance with certain aspects of the present disclosure.

As shown in FIG. 8B, each row/entry of the mini-slot table 800B is identified by a unique member ID and defines a different mini-slot structure for a given slot. Each row/entry of the mini-slot table 800B defines a number of mini-slots (M) per slot, a length vector of size M−1 defining a length of each mini-slot, a mapping type (A or B) for the first mini-slot of the given slot and a presence/absence of the last mini-slot in the given slot.

In an aspect, the number of mini-slots (M) per slot may be limited. For example, max M=4, meaning each slot can be divided into at most 4 mini-slots. In an aspect the vector indicating the length of each mini-slot is of length M−1 since the length of the last mini-slot of the given slot is not needed, as it is known given the other values. For example, given there are 14 symbols per slot, for the first slot sum of length should be equal to 14−S, and for other slots sum needs to be equal to 14. In an aspect, the information regarding the presence/absence of the last mini-slot is useful when the last few symbols are not allocated. As shown in table 800B, a one-bit value is used to indicate the presence/absence of the last mini-slot in the given slot, wherein a value of '1' indicates a presence of the last mini-slot and a value of '0' indicates an absence of the last mini-slot. Alternatively, instead of explicitly indicating the presence/absence of the last mini-slot, the value of n (actual number of PUSCHs) indicated in the DCI may be used to determine this information. For example, if PUSCH n is scheduled in a particular slot, and there are multiple mini-slots in the particular slot, the remaining mini-slots in the slot after the PUSCH n has been transmitted are not transmitted.

FIG. 8C illustrates an example allocation 800C according to TDRA patterns defined the table 800A, in accordance with certain aspects of the present disclosure.

As shown in FIG. 8B, allocation 810 corresponds to a multi-TTI grant allocating time domain resources according to the TDRA pattern corresponding to Row index 1 from the TDRA table 800A. Similarly, allocation 820 corresponds to a multi-TTI grant allocating time domain resources according to the TDRA pattern corresponding to Row index 2 from the TDRA table 800A. As shown, each of the allocations 810 and 820 shows allocation of time domain resources over three time slots, the first slot in each case carrying the DCI scheduling the corresponding multi-TTI grant.

As shown in allocation 810, the first PUSCH transmission (PUSCH 1) starts in slot 2, as the value of slot K2 in row index 1 is '1', which means an offset of one slot from the slot carrying the DCI grant. As shown, PUSCH 1 starts at symbol #3 as indicated by the value of starting symbol S (assuming symbol index ranges from 0-13). Row index 1 indicates that two slots are to be scheduled and the member ID vector indicates member ID 4 for the mini-slot structure of the first slot and indicates member ID 1 for the mini-slot structure of the second slot. As shown, the mini-slots within the two slots of allocation 810 are allocated in accordance with the mini-slot table 800B. Looking at member ID #4 of the mini-slot table 800B, 2 mini-slots are to be scheduled in the first scheduled slot, and the length of the first mini-slot in the first scheduled slot is 4 symbols. Since the last column of member ID 4 indicates a presence of the last mini-slot in the slot, the second mini-slot of the first scheduled slot (which is the last mini-slot of the slot) occupies the remaining slots of the first scheduled slot. Looking at member ID #1 of the mini-slot table 800B, 1 mini-slot is to be scheduled in the second scheduled slot. Since the last column of member ID 4 indicates a presence of the last mini-slot in the slot, the mini-slot of the second scheduled slot (which is the last mini-slot of the slot) occupies all slots of the second scheduled slot.

Similarly, allocation 820 allocates time domain resource in accordance with TDRA pattern defined in Row index 2, wherein the mini-slot structure of the scheduled slots is decided by the defined member IDs of the mini-slot table 800B.

In certain aspects, since the TDRA table 800A does not define the mini-slot structure of each scheduled slot (unlike table 700A of FIG. 7A), the RRC overhead is lower if the table 800A is configurable.

In an aspect, the number of slots K<=N as the number of slots is smaller than max number of PUSCHs since a PUSCH cannot cross the slot boundary.

In an aspect, in order to further reduce RRC overhead, additional restrictions may be introduced. For example, a maximum number of slots K_max may be defined. Alternatively, multi-TTI PUSCH may be limited such that only the first slot (or the first two slots) can contain mini-slots and the rest are full-slot PUSCH (i.e. mini-slots only allowed in the beginning). For example, K=1 (or K=2), and only the structure of the first (or first two) slots are indicated, and the rest of the PUSCHs (to be determined by value n in the DCI) are full-slots.

In certain aspects, a member of the mini-slot table 800B may be used in multiple entries/rows of the TDRA table 800A (i.e. can be defined once and used multiple times). This may help further reduce the RRC overhead.

E.g. member ID=1 can be used as part of an entry/row configuration from the TDRA table 800A for any entries/row that has one full-slot PUSCH among the multiple scheduled PUSCHs.

E.g. member ID=2 can be used as part of an entry/row configuration from the TDRA table 800A for any entries/rows corresponding to the first scheduled PUSCH (of multiple scheduled PUSCHs) that occupies until the end of the first slot.

Figure 9A:
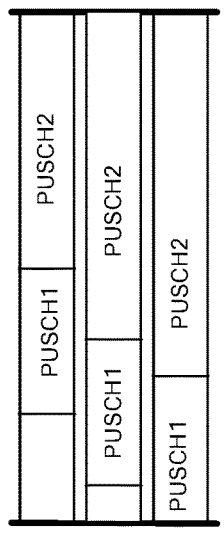
FIG. 9A illustrates three example TDRA corresponding to member ID=4 from table 800B, in accordance with certain aspects of the present disclosure.

E.g. member ID=4 can be used as part of an entry/row configuration for multiple structures. A first example is when member ID=4 is used as the first member ID (corresponding to the first scheduled slot) of an entry/row from the TDRA table 800A and S=4. A second example is when member ID=4 is used as the first member ID (corresponding to the first scheduled slot) of an entry/row from the TDRA table 800A and S=2. A third example is when member ID=4 is used as other than the first member ID of an entry/row from the TDRA table 800A. FIG. 9A illustrates these three examples for member ID=4.

Figure 9B:
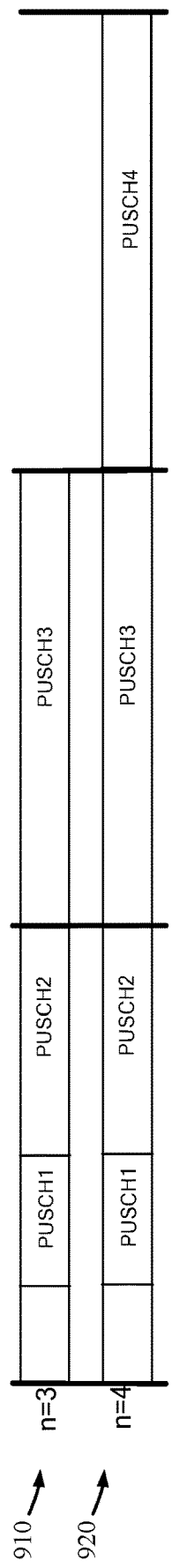
FIG. 9B illustrates an example TDRA when one entry/row from the TDRA table 800B covers multiple multi-TTI grant allocations, in accordance with certain aspects of the present disclosure.

FIG. 9B illustrates an example TDRA when one entry/row from the TDRA table 800B covers multiple multi-TTI grant allocations, in accordance with certain aspects of the present disclosure. As shown in FIG. 9B the row index 1 is used to allocate time domain resources for two different multi-TTI grant allocations 910 and 920. As shown, the member ID vector assigns member IDs to the three slots based on the example allocations discussed above. The actual number of PUSCH transmissions scheduled for allocation 910 is n=3. Thus, allocation 910 uses only the first two slot allocations from the table. Allocation 920 has n=4 and uses allocations defined for all 3 slots from the table.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 5 and 6.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communication by a User Equipment (UE), comprising:
receiving downlink control information (DCI) scheduling a plurality of physical uplink shared channel (PUSCH) transmissions for corresponding transport blocks (TBs), wherein time domain resources are allocated for the plurality of PUSCH transmissions according to a Time Domain Resource Allocation (TDRA) pattern selected from a TDRA table designed for multi-PUSCH grants, the DCI comprises an indication of the TDRA pattern, and each TDRA pattern comprises a slot offset only for the first scheduled PUSCH transmission of the plurality of PUSCH transmissions;
determining, based on the indication, the TDRA pattern from the TDRA table; and
determining, based on the determined TDRA pattern, the allocation of the time domain resources for the plurality of PUSCH transmissions.

2. The method of claim 1, wherein:
each row of the TDRA table corresponds to a different TDRA pattern;
each TDRA pattern is defined by allocation information in a plurality of columns of the corresponding row of the TDRA table; and
each TDRA pattern defines a different pattern for allocating time domain resources for the plurality of PUSCH transmissions.

3. The method of claim 2, wherein the allocation information for each TDRA pattern from the TDRA table comprises:
for at least a first scheduled PUSCH transmission of the plurality of PUSCH transmissions, information relating to a slot offset, a starting symbol, an allocation symbol length and a mapping type.

4. The method of claim 2, wherein the allocation information for each TDRA pattern from the TDRA table further comprises:
for each subsequent PUSCH transmission of the plurality of PUSCH transmissions, information relating to at least one of an allocation symbol length or a mapping type.

5. The method of claim 4, wherein the time domain resources allocated to each PUSCH transmission according to the allocation information in the TDRA table are contained within a slot of a subframe.

6. The method of claim 1, further comprising receiving an indication of a maximum number of transmissions that can be scheduled by the DCI via Radio Resource Control (RRC) signaling.

7. The method of claim 1, further comprising receiving a configuration of the TDRA table via Radio Resource Control (RRC) signaling.

8. A method of wireless communication by a base station (BS), comprising:
allocating time domain resources for a plurality of physical uplink shared channel (PUSCH) transmissions for corresponding transport blocks (TBs), according to a Time Domain Resource Allocation (TDRA) pattern selected from a TDRA table designed for multi-PUSCH grants and each TDRA pattern comprises a slot offset only for the first scheduled PUSCH transmission of the plurality of PUSCH transmissions; and
transmitting downlink control information (DCI) scheduling the plurality of PUSCH transmissions, wherein the DCI comprises an indication of the TDRA pattern selected from the TDRA table.

9. The method of claim 8, wherein:
each row of the TDRA table corresponds to a different TDRA pattern;
each TDRA pattern is defined by allocation information in a plurality of columns of the corresponding row of the TDRA table; and
each TDRA pattern defines a different pattern for allocating time domain resources for the plurality of PUSCH transmissions.

10. The method of claim 9, wherein the allocation information for each TDRA pattern from the TDRA table comprises:
for at least a first scheduled PUSCH transmission of the plurality of PUSCH transmissions, information relating to a slot offset, a starting symbol, an allocation symbol length and a mapping type.

11. The method of claim 10, wherein the allocation information for each TDRA pattern from the TDRA table further comprises:
for each subsequent PUSCH transmission of the plurality of PUSCH transmissions, information relating to at least one of an allocation symbol length or a mapping type.

12. The method of claim 10, wherein the time domain resources allocated to each transmission according to the allocation information in the TDRA table are contained within a slot of a subframe.

13. The method of claim 9, further comprising indicating a maximum number of transmissions that can be scheduled by the DCI via Radio Resource Control (RRC) signaling.

14. The method of claim 8, further comprising transmitting a configuration of the TDRA table via Radio Resource Control (RRC) signaling.

15. An apparatus for wireless communication by a User Equipment (UE), comprising:
a receiver configured to receive downlink control information (DCI) scheduling a plurality of physical uplink shared channel (PUSCH) transmissions, wherein time domain resources are allocated for the plurality of PUSCH transmissions according to a Time Domain Resource Allocation (TDRA) pattern selected from a TDRA table designed for multi-PUSCH grants, the DCI comprises an indication of the TDRA pattern, and each TDRA pattern comprises a slot offset only for the first scheduled PUSCH transmission of the plurality of PUSCH transmissions; and
at least one processor configured to determine, based on the indication, the TDRA pattern from the TDRA table and to determine, based on the determined TDRA pattern, the allocation of the time domain resources for the plurality of PUSCH transmissions.

16. The apparatus of claim 15, wherein:
each row of the TDRA table corresponds to a different TDRA pattern;
each TDRA pattern is defined by allocation information in a plurality of columns of the corresponding row of the TDRA table; and
each TDRA pattern defines a different pattern for allocating time domain resources for the plurality of PUSCH transmissions.

17. The apparatus of claim 16, wherein the allocation information for each TDRA pattern from the TDRA table comprises:
for at least a first scheduled PUSCH transmission of the plurality of PUSCH transmissions, information relating to a slot offset, a starting symbol, an allocation symbol length and a mapping type.

18. The apparatus of claim 16, wherein the allocation information for each TDRA pattern from the TDRA table further comprises:
for each subsequent PUSCH transmission of the plurality of PUSCH transmissions, information relating to at least one of an allocation symbol length or a mapping type.

19. The apparatus of claim 18, wherein the time domain resources allocated to each PUSCH transmission according to the allocation information in the TDRA table are contained within a slot of a subframe.

20. The apparatus of claim 15, further comprising receiving an indication of a maximum number of transmissions that can be scheduled by the DCI via Radio Resource Control (RRC) signaling.

21. The apparatus of claim 15, further comprising receiving a configuration of the TDRA table via Radio Resource Control (RRC) signaling.

22. An apparatus for wireless communication by a base station (BS), comprising:
at least one processor configured to allocate time domain resources for a plurality of physical uplink shared channel (PUSCH) transmissions, according to a Time Domain Resource Allocation (TDRA) pattern selected from a TDRA table designed for multi-PUSCH grants and each TDRA pattern comprises a slot offset only for the first scheduled PUSCH transmission of the plurality of PUSCH transmissions; and
a transmitter configured to transmit downlink control information (DCI) scheduling the plurality of PUSCH transmissions, wherein the DCI comprises an indication of the TDRA pattern selected from the TDRA table.

23. The apparatus of claim 22, wherein:
each row of the TDRA table corresponds to a different TDRA pattern;
each TDRA pattern is defined by allocation information in a plurality of columns of the corresponding row of the TDRA table; and
each TDRA pattern defines a different pattern for allocating time domain resources for the plurality of PUSCH transmissions.

24. The apparatus of claim 23, wherein the allocation information for each TDRA pattern from the TDRA table comprises:
for at least a first scheduled PUSCH transmission of the plurality of PUSCH transmissions, information relating to a slot offset, a starting symbol, an allocation symbol length and a mapping type.

25. The apparatus of claim 24, wherein the allocation information for each TDRA pattern from the TDRA table further comprises:
for each subsequent PUSCH transmission of the plurality of PUSCH transmissions, information relating to at least one of an allocation symbol length or a mapping type.

26. The apparatus of claim 24, wherein the time domain resources allocated to each transmission according to the allocation information in the TDRA table are contained within a slot of a subframe.

27. The apparatus of claim 23, further comprising indicating a maximum number of transmissions that can be scheduled by the DCI via Radio Resource Control (RRC) signaling.

28. The apparatus of claim 22, further comprising transmitting a configuration of the TDRA table via Radio Resource Control (RRC) signaling.

\* \* \* \* \*